(12) United States Patent
Irrer

(10) Patent No.: US 7,182,544 B2
(45) Date of Patent: Feb. 27, 2007

(54) TURNBUCKLE ASSEMBLY

(75) Inventor: Ryan Irrer, St. Johns, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 96 days.

(21) Appl. No.: 10/797,645

(22) Filed: Mar. 10, 2004

(65) Prior Publication Data

US 2005/0201821 A1    Sep. 15, 2005

(51) Int. Cl.
*F16B 7/06* (2006.01)
*B62D 7/20* (2006.01)

(52) U.S. Cl. .............. 403/43; 403/46; 403/77; 403/285; 403/286; 280/93.51

(58) Field of Classification Search ............... 403/43, 403/44, 46, 48, 76, 285, 286, 274, 296, 77; 280/93.51, 95.1, FOR. 107
See application file for complete search history.

(56) References Cited

U.S. PATENT DOCUMENTS

| | | | |
|---|---|---|---|
| 1,625,818 A | | 4/1927 | McArthur |
| 2,354,474 A | * | 7/1944 | Van Dyke et al. ............ 403/46 |
| 2,479,096 A | * | 8/1949 | Bratz ........................... 403/46 |
| 2,596,885 A | * | 5/1952 | Booth ......................... 403/343 |
| 2,670,974 A | * | 3/1954 | Dorey .......................... 403/43 |
| 2,678,225 A | * | 5/1954 | White .......................... 403/46 |
| 3,583,052 A | * | 6/1971 | Herbenar et al. ............. 403/43 |
| 3,736,891 A | | 6/1973 | Parsons |
| 3,832,072 A | | 8/1974 | Mazur |
| 3,837,755 A | * | 9/1974 | Benoit et al. ............... 403/274 |
| 3,938,822 A | | 2/1976 | Guerriero |
| 4,555,124 A | * | 11/1985 | Millington .................... 403/43 |
| 4,614,451 A | | 9/1986 | Braisted, Jr. |
| 4,657,424 A | | 4/1987 | Dong |
| 4,902,158 A | * | 2/1990 | Broszat et al. ................ 403/77 |
| 5,004,367 A | | 4/1991 | Wood, Jr. |
| 5,286,133 A | | 2/1994 | Wood |
| 5,429,447 A | | 7/1995 | Wood |
| 5,603,583 A | | 2/1997 | Jackson |
| 5,713,686 A | | 2/1998 | Maughan |
| 5,906,450 A | | 5/1999 | Ng |
| 6,325,566 B1 | * | 12/2001 | Devine ......................... 403/43 |

FOREIGN PATENT DOCUMENTS

JP                09242828 A    *   9/1997

* cited by examiner

*Primary Examiner*—Daniel P. Stodola
*Assistant Examiner*—Ernesto Garcia
(74) *Attorney, Agent, or Firm*—Tarolli, Sundheim, Covell & Tummino LLP

(57) ABSTRACT

A turnbuckle assembly (20) includes a first one-piece sleeve (30) having first and second axial ends (32, 34). The first axial end (32) of the first sleeve (30) has an internally threaded portion (35) which threadably engages a first threaded part (120). The first axial end (32) of the first sleeve (30) includes an integrally formed clamp (38) which clamps the first axial end (32) to the first threaded part (120). A second one-piece sleeve (60) has first and second axial ends (62, 64). The first axial end (62) of the second sleeve (60) has an internally threaded portion (65) which threadably engages a second threaded part (122). The first axial end (62) of the second sleeve (60) includes an integrally formed clamp (68) which clamps the first axial end (62) to the second threaded part (122). A connector member (90) interconnects the first and second sleeves(30, 60).

18 Claims, 2 Drawing Sheets

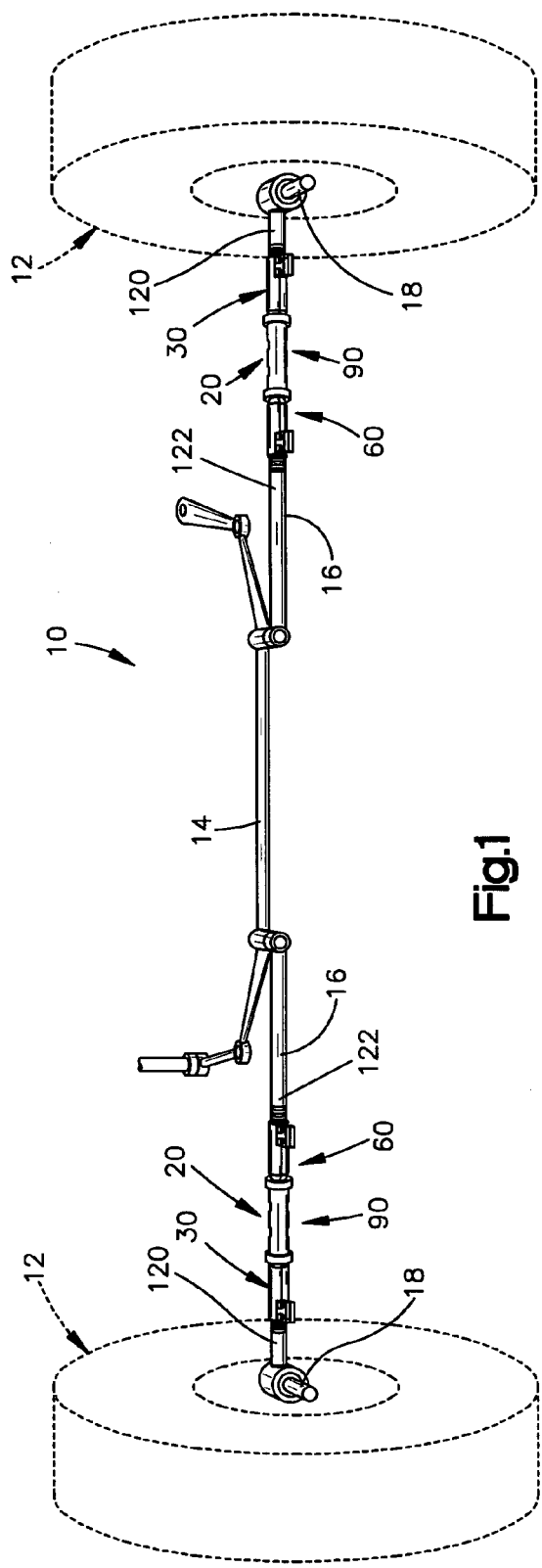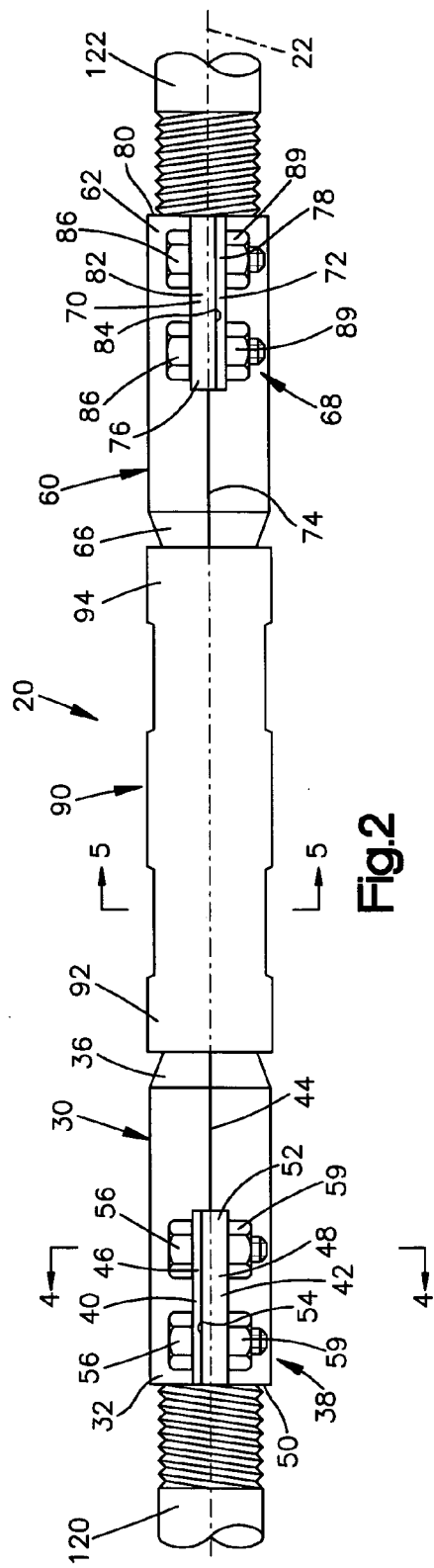

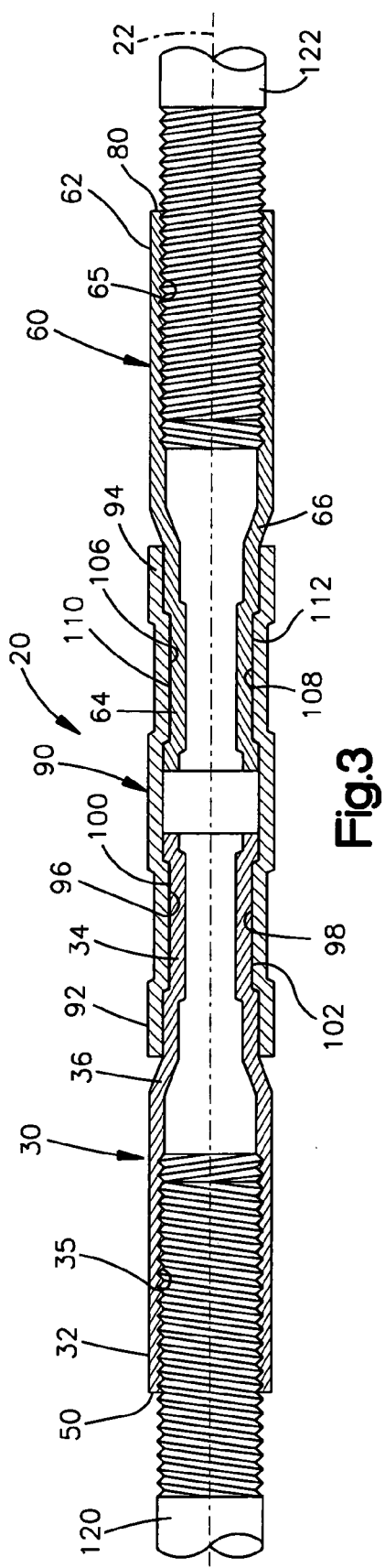
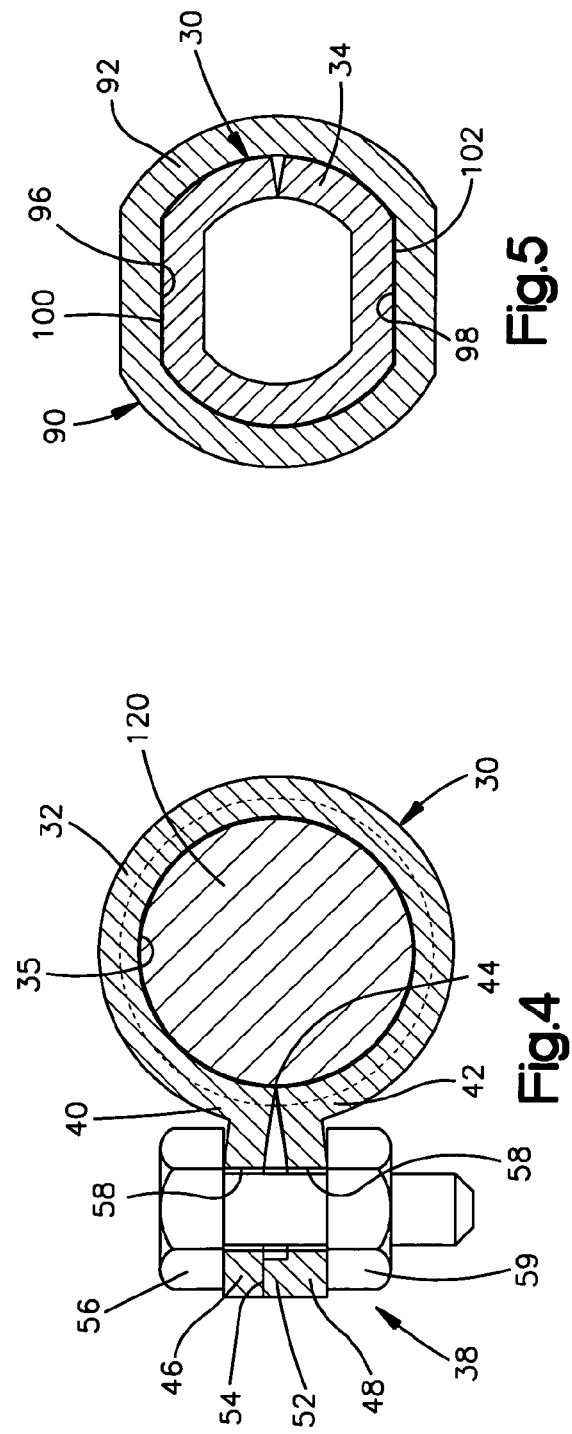
Fig.3
Fig.5
Fig.4

US 7,182,544 B2

TURNBUCKLE ASSEMBLY

FIELD OF THE INVENTION

The present invention relates to a turnbuckle assembly, and more specifically, the present invention relates to a turnbuckle assembly for use in a steering linkage of a vehicle.

BACKGROUND OF THE INVENTION

Turnbuckle assemblies for establishing an adjustable axial connection between two coaxial rod members are well known in the art. Such assemblies typically include an internally threaded tubular sleeve. Each end of the sleeve has an internally threaded portion that receives an associated externally threaded rod member. One sleeve end and its associated rod have left-hand threads. The other sleeve end and its associated rod have right-hand threads. As the sleeve is rotated, the rods are both screwed into or out of the sleeve depending on the direction of rotation of the sleeve. After the desired axial spacing between the two rods is achieved, a locking mechanism is used to lock the turnbuckle in place. Fasteners are applied to each end of the sleeve to force the internal sleeve threads tightly against the external rod threads and thereby hold the turnbuckle in place relative to the rods. Such fasteners include ring clamps tightened around the outside of the sleeve and jam nuts tightened axially against the ends of the sleeve.

SUMMARY OF THE INVENTION

The present invention relates to a turnbuckle assembly for use in a steering linkage of a vehicle including a first one-piece sleeve having first and second axial ends. The first axial end of the first sleeve has an internally threaded portion which threadably engages a first threaded part. The first axial end of the first sleeve includes an integrally formed clamp which clamps the first axial end to the first threaded part. A second one-piece sleeve has first and second axial ends. The first axial end of the second sleeve has an internally threaded portion which threadably engages a second threaded part. The first axial end of the second sleeve includes an integrally formed clamp which clamps the first axial end to the second threaded part. A connector member interconnects the first and second sleeves. The connector member has a first axial end non-rotatably connected to the second axial end of the first sleeve. The connector member has a second axial end non-rotatably connected to the second axial end of the second sleeve.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic illustration of an automotive steering system including a turnbuckle assembly in accordance with the present invention;

FIG. 2 is a side view of one turnbuckle assembly shown in FIG. 1;

FIG. 3 is a cross-sectional view of the turnbuckle assembly shown in FIG. 2;

FIG. 4 is a cross-sectional view of the turnbuckle assembly taken along the lines 4—4 in FIG. 2; and FIG. 5 is a cross-sectional view of the turnbuckle assembly taken along the lines 5—5 in FIG. 2.

DESCRIPTION OF THE INVENTION

A steering linkage 10 is illustrated in FIG. 1. The steering linkage 10 includes a pair of steerable wheels 12. The steerable wheels 12 are connected to a center link 14 through a corresponding pair of tie rods 16 and sockets 18. The sockets 18 are attached to the wheels in any suitable manner known in the art. Axial alignment of the steerable wheels 12 is accomplished by means of turnbuckle assemblies 20 associated with the tie rods 16. The turnbuckle assemblies 20 are substantially similar. Accordingly, only one turnbuckle assembly 20 will be described in detail.

The turnbuckle assembly 20 has a longitudinal axis 22 and (FIGS. 2 and 3) includes a first sleeve 30 and a second sleeve 60. A connector member 90 interconnects the first and second sleeves 30 and 60. The first sleeve 30 has a first axial end 32 and a second axial end 34 connected to a first axial end 92 of the connector member 90. The second sleeve 60 has a first axial end 62 and a second axial end 64. The second end 64 of the sleeve 60 is connected to a second axial end 94 of the connector member 90.

The first end 32 (FIG. 3) of the first sleeve 30 has a first diameter and the second end 34 has a second diameter smaller than the first diameter. An intermediate portion 36 tapers from the first end 32 to the second end 34. The first end 62 of the sleeve 60 has a first outer diameter equal to the first outer diameter of the first end 32 of the sleeve 30. The second end 64 of the sleeve 60 has a second outer diameter equal to the second outer diameter of the second end 34 of the first sleeve 30. An intermediate portion 66 of the sleeve 60 tapers from the first end 62 to the second end 64.

The first end 32 of the first sleeve 30 has a first threaded inner surface 35 with threads extending in a first or right-hand direction. The first end 62 of the second sleeve 60 has a second threaded inner surface 65 with threads extending in a second or left-hand direction.

The first sleeve 30 (FIGS. 2 and 4) includes an integrally formed clamp 38 formed as one piece with the sleeve 30. The clamp 38 includes a first clamping portion 40 and a second clamping portion 42. The clamping portions 40 and 42 extend on opposite sides of a longitudinally extending seam 44 of the sleeve 30.

The clamping portion 40 includes a radially extending portion 46 extending on an upper, as viewed in FIGS. 2 and 4, side of the seam 44. The clamping portion 42 includes a radially extending portion 48 extending on a lower, as viewed in FIGS. 2 and 4, side of the seam 44. The radially extending portions 46 and 48 (FIG. 2) extend generally parallel to each other from an axial end surface 50 of the sleeve 30 toward the intermediate portion 36. The radially extending portions 46 and 48 extend approximately half the distance from the axial end surface 50 to the intermediate portion 36 of the sleeve 30.

The clamping portion 42 includes a lip portion 52 extending upwardly, as viewed in FIG. 4, from the radially extending portion 48 toward the radially extending portion 46. The lip portion 52 has an upper surface 54 that engages the radially extending portion 46 on the clamping portion 40. Bolts 56 extend through a pair of aligned openings 58 in the radially extending portions 46 and 48. Nuts 59 threadably engage the bolts 56 to cause the clamping portions 40 and 42 to move toward each other. When the nuts 59 are threaded onto the bolts 56, the lip portion 52 engages the radially extending portion 46 and causes the radially extending portions 40 and 42 to deform.

The second sleeve 60 (FIG. 2) includes an integrally formed clamp 68 formed as one piece with the sleeve 60. The clamp 68 is similar to the clamp 38. Accordingly, the clamp 68 will not be described in detail. The clamp 68 includes a first clamping portion 70 and a second clamping 72. The clamping portions 70 and 72 extend on opposite sides of a longitudinally extending seam 74 of the sleeve 60.

The clamping portion 70 includes a radially extending portion 76 extending on an upper, as viewed in FIG. 2, side of the seam 74. The clamping portion 72 includes a radially extending portion 78 extending on a lower, as viewed in FIG. 2, side of the seam 74. The radially extending portions 76 and 78 extend generally parallel to each other from an axial end surface 80 of the sleeve 60 toward the intermediate portion 66. The radially extending portions 76 and 78 extend approximately half the distance from the axial end surface 80 to the intermediate portion 66 of the sleeve 60.

The clamping portion 72 includes a lip portion 82 extending downwardly, as viewed in FIG. 2, from the radially extending portion 78 toward the radially extending portion 76. The lip portion 82 has a lower surface 84 that engages the radially extending portion 76 on the clamping portion 70. Bolts 86 extend through a pair of aligned openings in the radially extending portions 76 and 78. Nuts 89 threadably engage the bolts 86 to cause the clamping portions 70 and 72 to move toward each other. When the nuts 89 are threaded onto the bolts 86, the lip portion 82 engages the radially extending portion 76 and causes the radially extending portions 76 and 78 to deform.

The connector member 90 (FIGS. 2 and 3) is a tubular member connected to the sleeves 30 and 60 by swaging or crimping. The second end 34 of the sleeve 30 is inserted into the first end 92 of the connector member 90. The first end 92 of the connector member 90 and the second end 34 of the sleeve 30 are deformed by swaging or crimping to connect the sleeve 30 to the connector member. Upon deforming the sleeve 30 and the connector member 90, parallel inner surfaces 96 and 98 (FIGS. 3 and 5) are formed on the connector member. Parallel outer surfaces 100 and 102 are formed on the second end 34 of the sleeve 30. The parallel outer surfaces 100 and 102 on the sleeve 30 engage the parallel inner surfaces 96 and 98 on the connector member 90 to prevent relative rotation between the connector member and the sleeve.

The second end 64 (FIG. 3) of the sleeve 60 is inserted into the second end 94 of the connector member 90. The second end 94 of the connector member 90 and the second end 64 of the sleeve 60 are deformed by swaging or crimping to connect the sleeve 60 to the connector member. Upon deforming the sleeve 60 and the connector member 90, parallel inner surfaces 106 and 108 are formed on the connector member. Parallel outer surfaces 110 and 112 are formed on the second end 64 of the sleeve 60. The outer parallel surfaces 110 and 112 on the sleeve 60 engage the inner parallel surfaces 106 and 108 on the connector member 90 to prevent relative rotation between the connector member and the sleeve.

The turnbuckle assembly 20 serves as an adjuster to fix the effective axial length of a tie rod 16, as shown in FIG. 1, by controlling the axial spacing between oppositely threaded first and second threaded parts or tie rod members 120 and 122 of the tie rod. The threaded part 120 (FIGS. 3 and 4) threadably engages the threaded inner surface 35 of the first end 32 of the sleeve 30. The threaded part 122 (Fig 3) threadably engages the threaded inner surface 65 of the first end 62 of the sleeve 60. When the threaded parts 120 and 122 are threaded into the sleeves 30 and 60 to establish the desired axial relationship therebetween, the clamps 38 and 68 are tightened to clamp the ends 32 and 62 of the sleeves 30 and 60 to the threaded parts 120 and 122. When the integral clamps 38 and 68 are tightened, a compressive force is exerted radially between the threaded inner surfaces 35 and 65 of the sleeves 30 and 60 and the engaged threads of the tie rod members 120 and 122.

With more specific reference to use of the turnbuckle assembly 20 for alignment of steerable wheels in a vehicle steering linkage 10 as shown in FIG. 1, the turnbuckle assembly 20 to be adjusted is loosened by loosening the bolts 56 and 86. Rotating the turnbuckle assembly 20 in one direction moves the oppositely threaded rod members 120 and 122 axially apart. Rotating the turnbuckle assembly 20 in an opposite direction moves the rod members 120 and 122 axially closer together. The turnbuckle assembly 20 is rotated to provide an axial spacing of the rod members 120 and 122 which provides a desired effective length of the tie rod 16 to align the steerable wheels 12. The bolts 56 and 86 are then tightened as described above.

From the above description of the invention, those skilled in the art will perceive improvements, changes and modifications. Such improvements, changes and modifications within the skill of the art are intended to be covered by the appended claims.

Having described the invention, the following is claimed:

1. A turnbuckle assembly comprising:

a first one-piece sleeve having first and second axial ends, said first axial end of said first sleeve having an internally threaded portion which threadably engages a first threaded part, said first axial end of said first sleeve including an integrally formed clamp which clamps said first axial end to the first threaded part, said first sleeve being hollow throughout the extent of the first sleeve;

a second one-piece sleeve having first and second axial ends, said first axial end of said second sleeve having an internally threaded portion which threadably engages a second threaded part, said first axial end of said second sleeve including an integrally formed clamp which clamps said first axial end to the second threaded part, said second sleeve being hollow throughout the extent of the second sleeve; and a connector member interconnecting said first and second sleeves, said connector member having a first axial end non-rotatably connected to said second axial end of said first sleeve, said connector member having a second axial end non-rotatably connected to said second axial end of said second sleeve;

said second axial end of said first sleeve having a first flat outer surface extending parallel to the axis of said first sleeve, said connecting member having a first flat inner surface extending parallel and transverse to the axis of said first sleeve and engageable with said first outer surface of said second axial end of said first sleeve to prevent relative rotation between said connecting member and said first sleeve, said first sleeve including an intermediate portion located between said first axial end of said first sleeve and said second axial end of said first sleeve, said intermediate portion of said first sleeve longitudinally tapering inwardly at all sides from said first axial end of said first sleeve to said second axial end of said first sleeve to define a frusto-conical shape; and said second axial end of said second sleeve having a first flat outer surface extending parallel to the axis of said second sleeve, said connecting member having a second flat inner surface extending parallel and transverse to the axis of said second sleeve and engageable with said first outer surface of said second axial end of said second sleeve to prevent relative rotation between said connecting member and said second sleeve, said second sleeve including an intermediate portion located between said first axial end of said second sleeve and said second axial end of said second sleeve, said intermediate portion of said second sleeve longitudinally tapering inwardly at all sides from said first axial end of said second sleeve to said second axial end of said second sleeve to define a frusto-conical shape.

2. A turnbuckle assembly as set forth in claim 1 wherein said first axial end of said first sleeve includes first and second clamping portions movable toward each other to clamp said first sleeve to the first threaded part, said first axial end of said second sleeve including first and second clamping portions movable toward each other to clamp said second sleeve to the second threaded part.

3. A turnbuckle assembly as set forth in claim 2 wherein each of said first and second clamping portions of said first sleeve includes a radially extending portion having a plurality of openings through which bolts extend to move the first and second clamping portions of said first sleeve toward each other, each of said first and second clamping portions of said second sleeve including a radially extending portion having a plurality of openings through which bolts extend to move said first and second clamping portions of said second sleeve toward each other.

4. A turnbuckle assembly as set forth in claim 2 wherein said first clamping portion of said first sleeve includes a portion extending toward said second clamping portion of said first sleeve, said first clamping portion of said second sleeve including a portion extending toward said second clamping portion of said second sleeve.

5. A turnbuckle assembly as set forth in claim 4 wherein said portion of said first clamping portion of said first sleeve has a surface extending parallel to said axis of said first sleeve, said portion of said first clamping portion of said second sleeve having a surface extending parallel to said axis of said second sleeve.

6. A turnbuckle assembly as set forth in claim 2 wherein said first sleeve has a longitudinally extending seam, said first and second clamping portions of said first sleeve extending on opposite sides of said seam in said first sleeve, said second sleeve having a longitudinally extending seam, said first and second clamping portions of said second sleeve extending on opposite sides of said seam in said second sleeve.

7. A turnbuckle assembly as set forth in claim 1 wherein said second end of said first sleeve has a second outer surface extending parallel to said axis and said first outer surface of said first sleeve, said connecting member having a third inner surface engageable with said second outer surface of said second end of said first sleeve to prevent relative rotation between said connecting member and said first sleeve, said second end of said second sleeve having a second outer surface extending parallel to said first outer surface and said axis of said second sleeve, said connecting member having a fourth inner surface engageable with said second outer surface of said second end of said second sleeve to prevent relative rotation between said connecting member and said second sleeve.

8. A turnbuckle assembly as set forth in claim 1 wherein said first end of said first sleeve has a first outer diameter, said second end of said first sleeve having a second outer diameter smaller than the first outer diameter, said first end of said second sleeve having a first outer diameter, said second end of said second sleeve having a second outer diameter smaller than the first outer diameter of said second sleeve.

9. A turnbuckle assembly as set forth in claim 1 wherein said connecting member is crimped to said second end of said first sleeve, said connecting member being crimped to said second end of said second sleeve.

10. A tie rod for an automotive vehicle, said tie rod comprising:

a first tie rod member including a first end portion having a left-hand, external thread and a second end portion having a socket;

a second tie rod member including a first end portion having having a right-hand, external thread and a second end portion having a socket;

a first sleeve having first and second axial ends, said first axial end of said first sleeve having an internally threaded portion which threadably engages said first end portion of said first tie rod member, said first axial end of said first sleeve including an integrally formed clamp which clamps said first axial end to said first end portion of said first tie rod member, said first sleeve being hollow throughout the extent of the first sleeve;

a second sleeve having first and second axial ends, said first axial end of said second sleeve having an internally threaded portion which threadably engages said first end portion of said second tie rod member, said first axial end of said second sleeve including an integrally formed clamp which clamps said first axial end to said first end portion of said second tie rod member, said second sleeve being hollow throughout the extent of the second sleeve;

a connector member interconnecting said first and second sleeves, said connector member having a first axial end non-rotatably connected to said second axial end of said first sleeve, said connector member having a second axial end non-rotatably connected to said second axial end of said second sleeve;

said second axial end of said first sleeve having a first flat outer surface extending parallel to the axis of said first sleeve, said connecting member having a first flat inner surface extending parallel and transverse to the axis of said first sleeve and engageable with said first outer surface of said second axial end of said first sleeve to prevent relative rotation between said connecting member and said first sleeve, said first sleeve including an intermediate portion located between said first axial end of said first sleeve and said second axial end of said first sleeve, said intermediate portion of said first sleeve longitudinally tapering inwardly at all sides from said first axial end of said first sleeve to said second axial end of said first sleeve to define a frusto-conical shape; and said second axial end of said second sleeve having a first flat outer surface extending parallel to the axis of said second sleeve, said connecting member having a second flat inner surface extending parallel and transverse to the axis of said second sleeve and engageable with said first outer surface of said second axial end of said second sleeve to prevent relative rotation between said connecting member and said second sleeve, said second sleeve including an intermediate portion located between said first axial end of said second sleeve and said second axial end of said second sleeve, said intermediate portion of said second sleeve longitudinally tapering inwardly at all sides from said first axial end of said second sleeve to said second axial end of said second sleeve to define a frusto-conical shape.

11. A tie rod as set forth in claim 10 wherein said first axial end of said first sleeve includes first and second clamping portions movable toward each other to clamp said first sleeve to said first end portion of said first tie rod member, said first axial end of said second sleeve including first and second clamping portions movable toward each other to clamp said second sleeve to said first end portion of said second tie rod member.

12. A tie rod as set forth in claim 11 wherein each of said first and second clamping portions of said first sleeve includes a radially extending portion having a plurality of openings through which bolts extend to move the first and second clamping portions of said first sleeve toward each other, each of said first and second clamping portions of said second sleeve including a radially extending portion having a plurality of openings through which bolts extend to move the first and second clamping portions of said second sleeve toward each other.

13. A tie rod as set forth in claim 11 wherein said first clamping portion of said first sleeve includes a portion extending toward said second clamping portion of said first sleeve, said first clamping portion of said second sleeve including a portion extending toward said second clamping portion of said second sleeve.

14. A tie rod as set forth in claim 13 wherein said portion of said first clamping portion of said first sleeve has a surface extending parallel to said axis of said first sleeve, said portion of said first clamping portion of said second sleeve having a surface extending parallel to said axis of said second sleeve.

15. A tie rod as set forth in claim 11 wherein said first sleeve has a longitudinally extending seam, said first and second clamping portions of said first sleeve extending on opposite sides of said seam in said first sleeve, said second sleeve having a longitudinally extending seam, said first and second clamping portions of said second sleeve extending on opposite sides of said seam in said second sleeve.

16. A tie rod as set forth in claim 11 wherein said second end of said first sleeve has a second outer surface extending parallel to said axis and said first outer surface of said first sleeve, said connecting member having a third inner surface engageable with said second outer surface of said second end of said first sleeve to prevent relative rotation between said connecting member and said first sleeve, said second end of said second sleeve having a second outer surface extending parallel to said first outer surface and said axis of said second sleeve, said connecting member having a fourth inner surface engageable with said second outer surface of said second end of said second sleeve to prevent relative rotation between said connecting member and said second sleeve.

17. A tie rod as set forth in claim 10 wherein said first end of said first sleeve has a first outer diameter, said second end of said first sleeve having a second outer diameter smaller than the first outer diameter of said first sleeve, said first end of said second sleeve having a first outer diameter, said second end of said second sleeve having a second outer diameter smaller than the first outer diameter of said second sleeve.

18. A tie rod as set forth in claim 10 wherein said connecting member is crimped to said second ends of said first and second sleeves.

* * * * *